United States Patent
Trethewey

(10) Patent No.: US 9,720,701 B2
(45) Date of Patent: Aug. 1, 2017

(54) PROVIDING SUPPORT FOR DEVICE STATES

(75) Inventor: James R. Trethewey, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 524 days.

(21) Appl. No.: 13/608,683

(22) Filed: Sep. 10, 2012

(65) Prior Publication Data

US 2014/0075178 A1    Mar. 13, 2014

(51) Int. Cl.
*G06F 1/32* (2006.01)
*G06F 9/44* (2006.01)

(52) U.S. Cl.
CPC .......... *G06F 9/4421* (2013.01); *G06F 1/3206* (2013.01)

(58) Field of Classification Search
CPC .................................................... G06F 1/3206
USPC ........................................................ 713/100
See application file for complete search history.

(56) References Cited

U.S. PATENT DOCUMENTS

| | | | |
|---|---|---|---|
| 7,213,057 B2 | 5/2007 | Trethewey et al. | |
| 8,902,155 B2 * | 12/2014 | Kabasawa et al. | 345/156 |
| 9,058,826 B1 * | 6/2015 | Guo | G11B 20/18 |
| 9,076,471 B1 * | 7/2015 | Chen | G11B 21/12 |
| 2005/0060377 A1 | 3/2005 | Lo et al. | |
| 2005/0060575 A1 | 3/2005 | Trethewey et al. | |
| 2005/0131715 A1 | 6/2005 | Trethewey | |
| 2006/0053311 A1 * | 3/2006 | Chary | G06F 1/324 |
| | | | 713/300 |
| 2006/0150731 A1 * | 7/2006 | Fontanella | G01P 15/0891 |
| | | | 73/488 |
| 2006/0176174 A1 * | 8/2006 | Gollu et al. | 340/539.13 |
| 2007/0018811 A1 * | 1/2007 | Gollu | 340/539.13 |
| 2007/0079030 A1 | 4/2007 | Okuley et al. | |
| 2007/0288467 A1 * | 12/2007 | Strassner | H04L 41/0226 |
| 2008/0152034 A1 | 6/2008 | Liu et al. | |
| 2009/0082880 A1 * | 3/2009 | Saunders | G05B 15/02 |
| | | | 700/9 |
| 2009/0224867 A1 | 9/2009 | O'Shaughnessy et al. | |

(Continued)

FOREIGN PATENT DOCUMENTS

| | | |
|---|---|---|
| CN | 1742249 A | 3/2006 |
| CN | 1781296 A | 5/2006 |
| CN | 101040241 A | 9/2007 |

(Continued)

OTHER PUBLICATIONS

Needham, et al., "Orientation Sensing Computing Devices", PCT Patent Application No. PCT/US2012/030488, filed on Mar. 25, 2012, 29 pages.

(Continued)

*Primary Examiner* — Kim Huynh
*Assistant Examiner* — Eric Chang
(74) *Attorney, Agent, or Firm* — International IP Law Group, P.L.L.C.

(57) ABSTRACT

A method of providing support for power-management of a device. The method may include gathering contextual data from a sensor communicatively coupled to a sensor controller. The method may also include receiving power-management data including an operational state of a main processor of the device. The method may also include modifying the operation of the device based on the contextual data and the power management data.

21 Claims, 4 Drawing Sheets

(56) References Cited

U.S. PATENT DOCUMENTS

2012/0203491 A1    8/2012   Sun et al.
2012/0221207 A1    8/2012   Nakamura

FOREIGN PATENT DOCUMENTS

| CN | 101578571 A | 11/2009 |
|----|-------------|---------|
| EP | 2 315 102 A1 | 4/2011 |
| WO | 2012/099363 A2 | 7/2012 |
| WO | 2014/039824 A1 | 3/2014 |

OTHER PUBLICATIONS

Kumar, et al., "Cascading Power Consumption", U.S. Appl. No. 13/608,479, filed Sep. 10, 2012, 34 pages.
Trethewey, et al., "Providing Support for Display Articulation-Related Applications" U.S. Appl. No. 13/608,356, mailed on Sep. 10, 2012, 26 pages.
Trethewey, et al., "Providing Support for Position-Related Applications", U.S. Appl. No. 13/608,159, filed Sep. 10, 2012, 30 pages.
Trethewey, et al., "Sensor and Context Based Adjustment of the Operation of a Network Controller", U.S. Appl. No. 13/608,419, filed Sep. 10, 2012, 31 pages.
International Search Report and Written Opinion received for PCT Patent Application No. PCT/US2013/058512, mailed on Jan. 7, 2014, 12 pages.
CN Search Report, CN Filing No. 201380042491.X, Dated Aug. 3, 2016, 1 page.
CN Search Report, CN Filing No. 201380042491.X, dated Mar. 23, 2017, 2 pages.

\* cited by examiner

300

PROVIDING SUPPORT FOR DEVICE STATES

TECHNICAL FIELD

This disclosure relates generally to providing support for power-management and operational sates of a device based on contextual data. Specifically, this disclosure relates to a method involving a sensor controller configured to gather contextual data and modify the operational states of a computing device.

BACKGROUND ART

Some devices may use operating systems that may, in turn, use open standards for device configuration and power management by the operating system. The open standards may consolidate, check, and improve existing power and configuration standards for hardware devices. Some open standards bring power management under the control of the operating system. Open standards such as the Advanced Configuration and Power Interface (ACPI) specification aims to consolidate, check, and improve upon existing power and configuration standards for hardware devices including bringing power management under the control of the operating system.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, the present techniques relate generally to providing support for power-management including transitions between operational states of a device based on contextual data. Power-management may include providing power-management data including policies as well as the operational state of the device. In general, a sensor controller may be configured to receive the power-management data including the operational state of the device. The sensor controller may gather data from one or more sensors. The data gathered from the sensors may indicate the context or the environment of the device. By analyzing the data gathered from the sensors in relation to the power-management data, the sensor controller may modify the operational state of the device by, for example, waking up a main processor of the device when the data gathered from the sensors indicates that a specified threshold may be met.

In embodiments, the sensor controller may be referred to herein as a sensor controller hub or a sensor hub having sensors communicatively coupled to the sensor controller hub. In embodiments, the operational states may be device states defined by open standard specifications such as the Advanced Configuration and Power Interface (ACPI) standardized specification for configuration and power management by the operating system. In embodiments, the device states may be more specifically defined by the Human Input Device (HID) Universal Serial Bus (USB) Committee, and may include a full power state, a low power state, a standby, a sleep with wake state, and a power off state.

The contextual data, as referred to herein, is data indicating the context or environment of a computing device. The contextual data is data gathered from one or more sensors, and includes various data such as magnetic headings, magnetic north, linear acceleration, rotational velocity, global position, altitude, pressure, ambient light, proximity to a user or another device, and the like. The sensor controller may consume relatively less power than the main processor of the computing device, and may be configured to monitor an environment or context of the computing device while the main processor is asleep.

Figure 1:
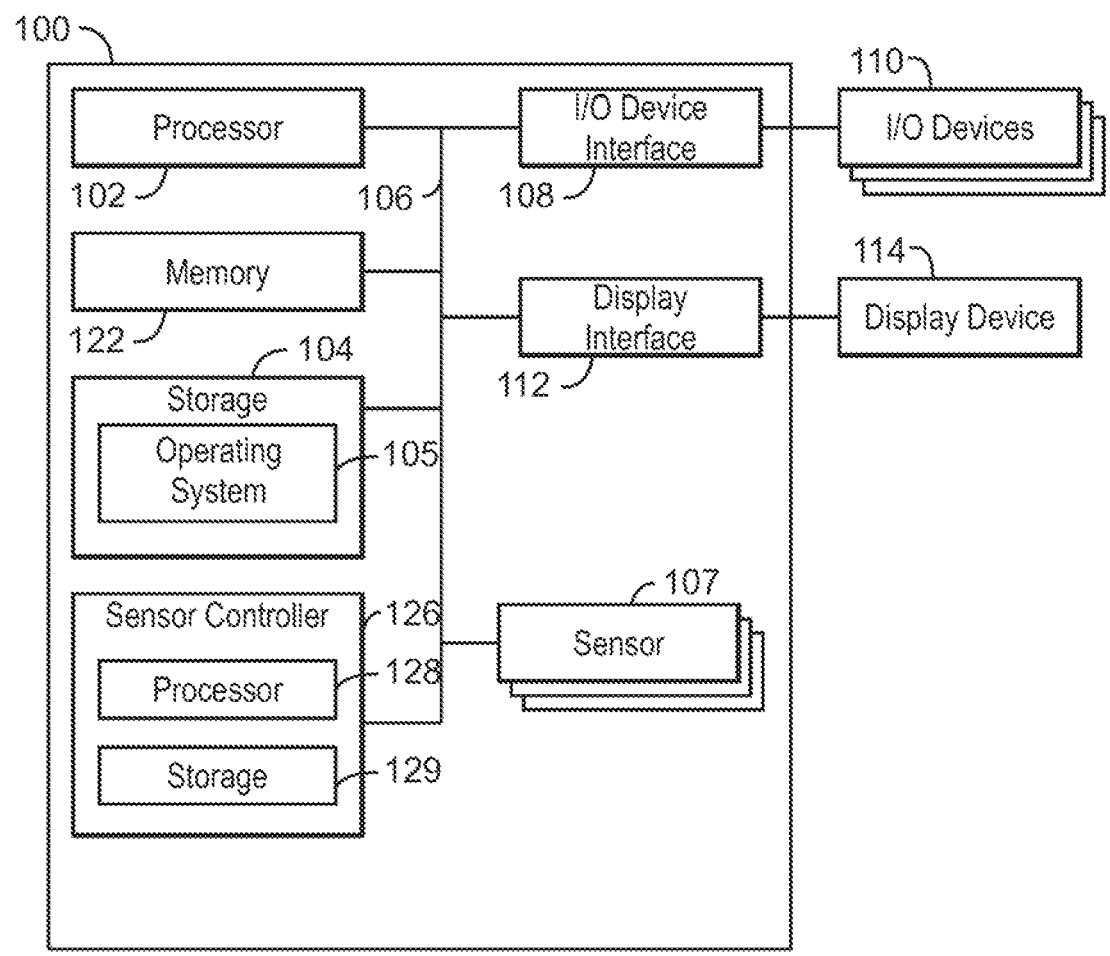
FIG. 1 is a block diagram of a computing device that provides support for managing device states based on contextual data, in accordance with embodiments.

FIG. 1 is a block diagram of a computing device 100 that provides support for managing device states based on contextual data, in accordance with embodiments. The computing device 100 may be, for example, a laptop computer, desktop computer, tablet computer, mobile device, server, or cellular phone, among others. The computing device 100 may include a main processor 102 that is adapted to execute stored instructions, as well as a memory device 122 that stores instructions that are executable by the main processor 102. The main processor 102 can be a single core processor, a multi-core processor, a computing cluster, or any number of other configurations. The main processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 102 includes dual-core processor(s), dual-core mobile processor(s), or the like.

The memory device 122 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 122 and that are executed by the main processor 102 may be used to provide support for managing device states based on contextual data.

The main processor 102 may be connected through a system bus 106 (e.g., PCI, ISA, PCI-Express, HyperTransport®, NuBus, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The main processor 102 may also be linked through the system bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100.

The computing device 100 may also include a storage device 104. The storage device 104 may include a physical memory such as a hard drive, an optical drive, a flash drive, an array of drives, or any combinations thereof. The storage device 104 may also include remote storage drives. The storage device 104 may also include an operating system 105. The storage device 104 may store instructions thereon to provide support for managing device states based on contextual data. In some embodiments, the operating system 105 may have installed thereon one or more drivers. The drivers enable a piece of hardware or an application installed on the operating system 105 to communicate with the operating system 105, applications, or other hardware of the computing device 100 including one or more sensors 107. The drivers may also be used to enable the operating system 105 to communicate policies and instructions regarding what actions should be taken when operational state transitions occur to the sensor controller 126, in accordance with embodiments. In embodiments, the sensors 107 are connected to processor 102 via bus 106. The sensors 107 may also be connected directly to processor 128 via a private bus (not shown), and communicatively coupled to processor 102 through processor 128 acting as intermediary. In embodiments, the drivers are installed on the memory device 122. The memory device 122 may include instructions used to provide support for managing device states based on contextual data.

The sensor controller 126 may include a processor 128. In embodiments, the processor 128 is distinct from the main processor 102 of the computing device 100. The sensor controller 126 may also include an additional memory or storage device 129 with instructions thereon to provide support for managing device states based on contextual data.

The processor 128 may execute stored instructions stored on either the memory device 122 and/or the storage device 104 and/or storage device 129 to provide support for managing device states based on contextual data. The instructions may cause the processor 128 to receive power-management data including an operational data of the computing device. The instructions may also cause the processor 128 to gather contextual data from the one or more sensors 107. The power-management data may also include power-management policies related to the operational state of the computing device. In embodiments, the policies may direct the processor 128 to wake-up the computing device 100 when the operational data indicates that the device is in the sleep state and based on the contextual data gathered by one or more sensors 107. The one or more sensors 107 may include: an accelerometer, a gyrometer, a proximity sensor, a motion detection sensor, a real-time clock, and the like. The instructions may cause the processor 128 to modify the operational state of the computing device based on the contextual data. For example, the contextual data may indicate the proximity of user and that the user is nearby and may wake the computing device 100 from a sleep state as discussed in more detail herein.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
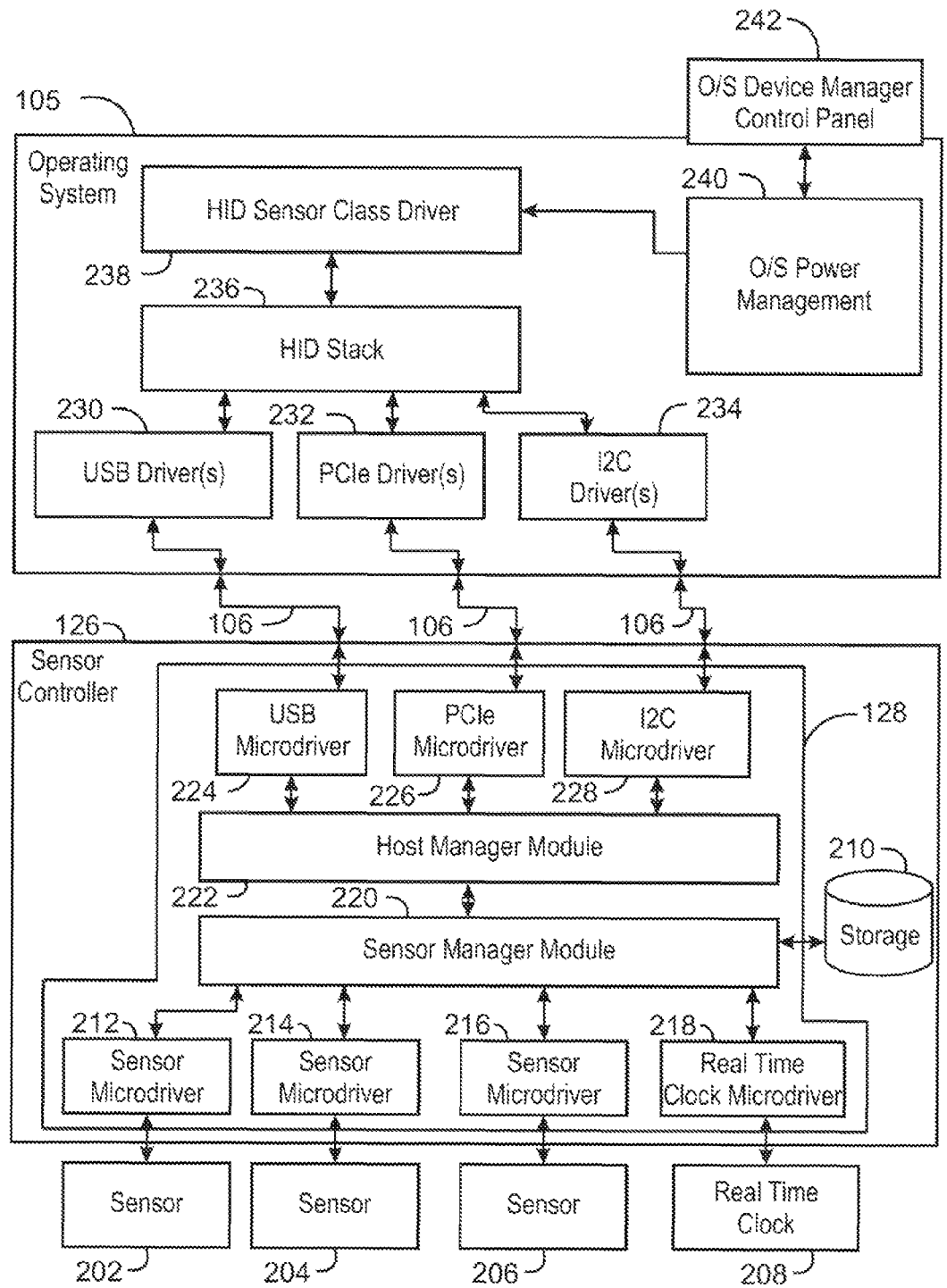
FIG. 2 is a system for providing support for managing device states based on contextual data, in accordance with embodiments.

FIG. 2 is a system 200 for providing support for managing device states based on contextual data, in accordance with embodiments. The system 200 may include the sensor controller 126 and the operating system 105, which may be included in the computing device 100 of FIG. 1. In addition, the system 200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

As show in FIG. 2, the sensor controller 126 may be communicatively coupled to the operating system 105, and may include the processor 128. The instructions involved in providing position support to the operating system 105 may be carried about by the processor 128 rather than a main processor, such as the main processor 102 of the computing device 100. By including the processor 128, power may be saved in processing the task of providing position data to applications on the operating system 128.

FIG. 2 is a system for providing support for managing device states based on contextual data, in accordance with embodiments. The system 200 may also include one or more sensors 202, 204, 206, 208 that may be included in the one or more sensors 107. Specifically, the one or more sensors 107 may include an accelerometer, a gyrometer, an ambient light sensor, a real-time clock sensor, a GPS sensor, among other sensors that may be useful to determine the context of the computing device 100 of FIG. 1. The sensors 202, 204, 206, 208 may be communicatively coupled to the sensor controller 126 by an interface including, but not limited to, an I2C bus, a USB cable, and the like. The sensor controller 126 may also be communicatively coupled to the operating system 105, by the interface 106. The one or more sensors 202, 204, 206, 208 may also be included as internal components of the sensor controller 126.

In operation, the contextual data may include acceleration data, GPS data, orientation data, ambient light data, real-time clock data, and the like. The sensor controller 126 of the system 200 may receive contextual data from a sensor, such as one of the sensors 202, 204, 206, 208. The sensor controller 126 may include the processor 128. The processor 128 may include various software modules configured to carry out functions to provide support to modify the device state of the computing device 100 of FIG. 1.

Although not shown in FIG. 2, the system 200 may include the main processor 102 of the computing device 100 discussed in reference to FIG. 1. The sensor controller 126 may also include a computer-readable medium, or storage device 129 that stores instructions thereon that, when executed by the processor 128, direct the processor 128 of the sensor controller 126 to receive power-management data including an operational state of the computing device 100 communicatively coupled to the sensor controller 126. The instructions may also direct the processor 128 to modify the operational state of the computing device 100 based on the contextual data.

The sensor controller 126 may receive power-management data including the operational state of the computing device 100. For example, the power-management data may describe the operational state of the main processor 102 of the computing device 100. The operational states may include one or more of a run state or full power state, a low power state, a standby state, a sleep state, and an power off state. In some embodiments, the operational states are defined by the ACPI specification standards for device configuration and power management. For example, the sleep state may be configured to describe when the main processor 102 is asleep and can be awakened. As another example, the power off state may be configured to describe when the main processor is completely powered off and cannot be awakened by the sensor controller 126 but must be powered on by a power button for example.

The instructions may further direct the processor 128 to analyze the contextual data to determine when the contextual data indicates that a predetermined threshold has been met. By enabling the sensor controller 126 to wake up the main processor 102, the computing device 100 may consume relatively less power than if the contextual data were analyzed by the main processor 102.

In some embodiments, the predetermined threshold may be determined by a user of the computing device 100. In other embodiments, the predetermined threshold may be determined by an application or a program installed on the operating system 105. The thresholds may be met by exceeding the threshold, dropping below the threshold, meeting the threshold, crossing a zero point of the threshold, exceeding a time-relative frequency or period, exceeding a predetermined minimum or maximum valid range, an amount of data being received which defines the predetermined threshold, any combination thereof, or the like. In some embodiments, the predetermined threshold is sensor-specific and may be met by an event that is sensor-specific including: meeting a gravitational force threshold on an accelerometer; meeting an angular rotation speed on a gyrometer, meeting a specified light level on an ambient light sensor, or the like. The sensor controller 126 is configured to gather contextual data and analyze the contextual data when the main processor 102 is in the sleep state, as well as in any other device state.

In some embodiments, the stored instructions may further direct the processor 128 to modify the operation of the sensor controller 126 based on the device state data. For example, the power-management data may indicate that the main processor 102 of the computing device 100 is in the power off state. The processor 128 of the sensor controller 126 may power down one of the one or more sensors 202, 204, 206, 208 when the main processor 102 is in the power off state. Additional examples are provided below.

In embodiments, the computing device 100 may be a laptop computer, and it may be desirable to provide protection to storage 104 which may be a hard disk drive. In some examples, the storage 104 may be physically damaged if subjected to excessive linear accelerations, which might occur if the laptop computer were to be dropped from a table to the floor, even when the processor 102 is in a sleep or powered off state. The sensor controller 126 may have received power-management data from the processor 102 specifying a linear acceleration threshold. In response, the sensor controller 126 may power off most sensors 204, 206 other than accelerometer 202, and only monitor the accelerometer 202 for linear accelerations greater than or equal to the threshold. In embodiments, the sensor controller 126 may provide instruction to the main processor 102. When the threshold is met or crossed, the sensor controller 126 may send a message to the hard disk drive to lock read/write heads associated with the hard disk drive, thereby protecting the hard disk drive from damage upon full impact. The message sent by the sensor controller 126 may either be delivered via the processor 102 after waking the processor 102, or for expedience, the message may be delivered directly to the hard disk drive using sideband signaling.

In embodiments, the computing device 100 may be a tablet PC, and it may be desirable to provide map-based navigation to a user while they are in motion. The processor 102 may be programmed to enter a power-saving sleep mode during brief periods of undetected acceleration. The processor 102 may also notify the sensor controller 126 of power-management data including specified linear acceleration and rotational velocity thresholds appropriate for map-based navigation. In response, the sensor controller 126 may power off most sensors other than the accelerometer 202 including the gyrometer 204. The gyrometer 204 can be powered off because it may consume significantly more power than other sensors. When the user is in motion again (as detected by the accelerometer 202), the sensor controller 126 can power up the gyrometer 204 so that turns around the street corner (as would be detected by the gyrometer 204) can be monitored. This technique of using activity on a lower-power sensor to determine when to automatically power on or off a higher-power sensor is referred to as "sensor cascading".

In embodiments, the computing device 100 may be an "all in one" style desktop computer (meaning that the computer motherboard and display are integrated into a single chassis), and it is desirable to use a camera to perform face recognition of the user as a biometric factor for logon authentication. The camera may consume significant power to capture images of the user, regardless of whether they are actually present in front of the computer or not. The processor 102 may be programmed to enter a low-power sleep state or power off state during periods of inactivity by the user, and may notify the sensor controller 126 of power-management data including a specified user proximity threshold. In response, the sensor controller 126 may turn off the camera and most sensors 202, 204 except for the proximity sensor 206. When the user approaches the computing device 100, and crosses the threshold for the proximity sensor 206, the sensor controller 126 can turn on the camera and wake the computing device 100. The camera can perform recognition of the user's face and provide the authentication to the operating system 105.

The processor 128 of the sensor controller 126 may include one or more microdrivers 212, 214, 216, 218 of the processor 128. The one or more microdrivers 212, 214, 216, 218 may format the contextual data received from the sensors 202, 204, 206, 208, by removing any vendor-specific indicators or otherwise formatting the contextual data to describe the contextual data in a generic manner. Each of the one or more microdrivers 212, 214, 216, 218 may be individually coupled with an associated type of sensor to which each is connected. For example, the microdriver 212 may be coupled to the sensor 202 which may be an accelerometer. As discussed, each of the one or more microdrivers 212, 214, 216, 218 may format contextual data by removing vendor specific indicators including, but not limited to, vendor registry sets. The one or more microdrivers 212, 214, 216, 218 may also be configured to direct the one or more sensors 202, 204, 206, 208 to gather the contextual data.

The system 200 may also include a sensor manager module 220 of the processor 128. The sensor manager module 220 may analyze the contextual data gathered by the one or more sensors 202, 204, 206, 208. The sensor manager module 220 may analyze the contextual data to determine whether the predetermined threshold has been met. The sensor manager module 220 may perform various actions in response to the predetermined threshold being met. For example, the sensor manager module 220 may be configured to a generate bus-specific wake-up signal and/or a bus-independent sideband GPIO (general-purpose input/output) signal to be sent to the operating system 105 of the computing device 100. The sensor manager module 220 may also be configured to modify the operation of the sensor controller 126 by powering down one of the one or more sensors 202, 204, 206, 208 based on the power-management data indicating, for example, that the main processor 102 of the computing device 100 is in the power off state.

In some embodiments, the sensor 208 may be a real-time clock sensor configured to generate timestamp data related to contextual data gathered by any of the one or more sensors 202, 204, 206. The real-time clock sensor may be embedded as a part of the sensor controller 126 or may be an external component communicatively connected to the sensor controller 126. The microdriver 218 may be a real-time clock microdriver configured to direct the real-time clock sensor to gather timestamp data. The processor 128 may be configured to associate the timestamp data with the analyzed contextual data. The sensor manager module 220 may be configured to store the associated timestamp data and analyzed contextual data in the storage device 210 before the predetermined threshold has been met. The sensor controller 126 may be configured to provide the associated timestamp data and the analyzed contextual data to the main processor 102 once the predetermined threshold has been met. By providing the associated timestamp data and analyzed contextual data to the main processor 102, the main processor 102 may be provided with relatively more data indicating the context which may have led up to the predetermined threshold being met than if the stored data had not provided.

The sensor controller 126 may include a host manager module 222 and one or more bus-specific microdrivers 224, 226, 228. The sensor controller 126 may be configured to provide signals from the sensor manager module 220 to the host operating system 105 via the host manager module 222 and the one or more bus-specific microdrivers 224, 226, 228. The host manager module 222 may be programmed to provide generic bus-independent services to the sensor manager module 220, and allow a plurality of bus interfaces to be employed individually or simultaneously by mediating through bus-specific microdrivers 224, 226, 228. The bus-specific microdrivers 224, 226, 228 may be configured to interface with the operating system 105 via one or more system buses including, for example, a universal serial bus (USB), a peripheral component interconnect express (PCIe), a simple peripheral bus framework (SPB), a vendor-specific $I^2C$ bus, and the like. Therefore, the microdriver 224 may be a USB interface microdriver configured to interface with a USB driver 232 of the operating system 105. The microdriver 226 may be a PCIe interface microdriver configured to interface with the PCIe driver 232 of the operating system 105. The microdriver 228 may be a $I^2C$ interface microdriver configured to interface with a $I^2C$ driver 234 of the operating system 105. This bus-specific microdrivers 224, 226, 228 may be programmed such that they translate bus-specific signaling (USB-specific signaling, PCIe-specific signaling, or I2C-specific signaling) to generic bus-independent equivalents understood by the host manager module 222.

The operating system 105 may include several other components including a human interface device (HID) driver stack 236, a HID sensor class driver 238, an operating system power management module 240, and an operating system device manager control panel 242. The operating system device manager control panel 242 may be an application installed on the operating system 105 configured to enable a user to set policies, rules, conditions, and the like that may establish the predetermined threshold discussed above with respect to the operation of the sensor controller 126. The predetermined thresholds may be provided to the sensor controller 126. The operating system power management module 240 may be configured to provide the power-management data as well as the predetermined threshold including other policies, rules, and conditions via drivers including the HID sensor class driver 238. The HID driver stack 236 may be configured to format the data including the power-management data according to a state property standard format associated with HID specification standards. The HID sensor class driver 238 may also be configured to communicate the analyzed contextual data provided by the sensor controller 126 to the operating system 105 via an operating system-specific sensor application programming interface.

Figure 3:
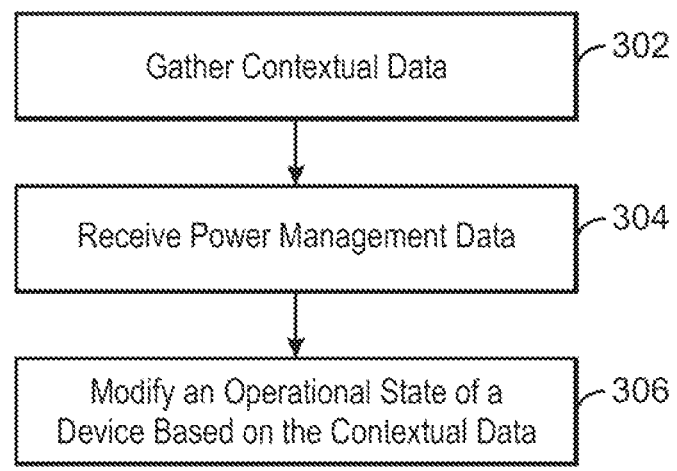
FIG. 3 is a process flow diagram showing a method for providing support for managing device states based on contextual data, in accordance with embodiments.

FIG. 3 is a process flow diagram showing a method 300 for managing device states based on contextual data in accordance with embodiments. The method 300 may be carried out by the computing device 100 in embodiments of FIG. 1. The method 300 may be carried out by the sensor controller 126 in cooperation with the operating system 105 of FIGS. 1 and/or 2.

At block 302, contextual data may be gathered from a sensor communicatively coupled to a sensor controller. In one example, the contextual data may be accelerometer data indicating the acceleration of the device.

The process flow continues at block 304, where power-management data including an operational state of a device is received. The power-management data may include whether the device is awake, asleep, off, or the like. The power-management data may be provided to the sensor controller from the device via various drivers and applications configured to deliver data including signals indicating device state and transitions of device state.

At block 306, the operational state of the device may be modified based on the contextual data. The operational state of the device may be modified when the contextual data indicates that a predetermined threshold has been met. For example, if the power-management data indicates that the device is in a sleep state, the sensor controller may modify the operational state of the device by waking up the device when the contextual data indicates that the predetermined threshold has been met.

An accelerometer threshold may be defined in units of measurement called "G's", where 1.0 G represents the acceleration of gravity toward the Earth's center. While stationary on the Earth's surface, an accelerometer is expected to report 1.0 G in the direction of the Earth's center. Actual linear acceleration motions of the computing device cause (by vector addition) the accelerometer to report a value different than 1.0 G. The operational state of a computing device may be modified based on a change in measurement from the accelerometer. For example, a threshold value of 0.2 G may indicate a change in operational state when a value of less than or equal to 0.8 G or a value of greater than or equal to 1.2 G is reported. This type of threshold is relative because it defines a range around a nominal value.

An ambient light sensor threshold may be defined in units of measurement called "Lux". While indoors, an ambient light sensor would normally be expected to report in the range of 10 to 1000 Lux, while outdoors a value of 10,000 or higher would be typical. In some examples, a threshold of any suitable Lux value may trigger a change in operational state of a computing device. For example, a change in operational state may occur when a computing device enters indoors from outdoors or when a computing device exits indoors to outdoors. This type of threshold can be any fixed value, often between two nominal values.

A proximity sensor threshold may be defined in units of measurement for distance, such as "Centimeters". In some examples, a user may be expected to be positioned within a certain distance from a computing device. A user who is not present within a certain distance from the computing device would result in a proximity sensor reporting a very large number or some symbolic equivalent of "infinity". A threshold can be triggered when a user approaches within a particular distance from the computing device.

The computing device 105 may include any variety of computing devices. Examples of a computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a computing device may also include a computer that is arranged to be worn or grasped by a person, such as a wrist computer, finger computer, ring computer, eyeglass computer, belt-clip computer, arm-band computer, shoe computer, clothing computer, pen computer, puck computer, or any other suitable type of wearable or graspable computer. For example, the computing device may be implemented as a smart phone capable of executing computer applications, as well as voice communications and/or data communications. Although some embodiments may be described with a computing device implemented as a smart phone by way of example, it may be appreciated that other embodiments may be implemented using other mobile computing devices as well. The computing device may also include a graphics processing unit (GPU) that is configured to execute stored instructions and a storage device that stores instructions.

Figure 4:
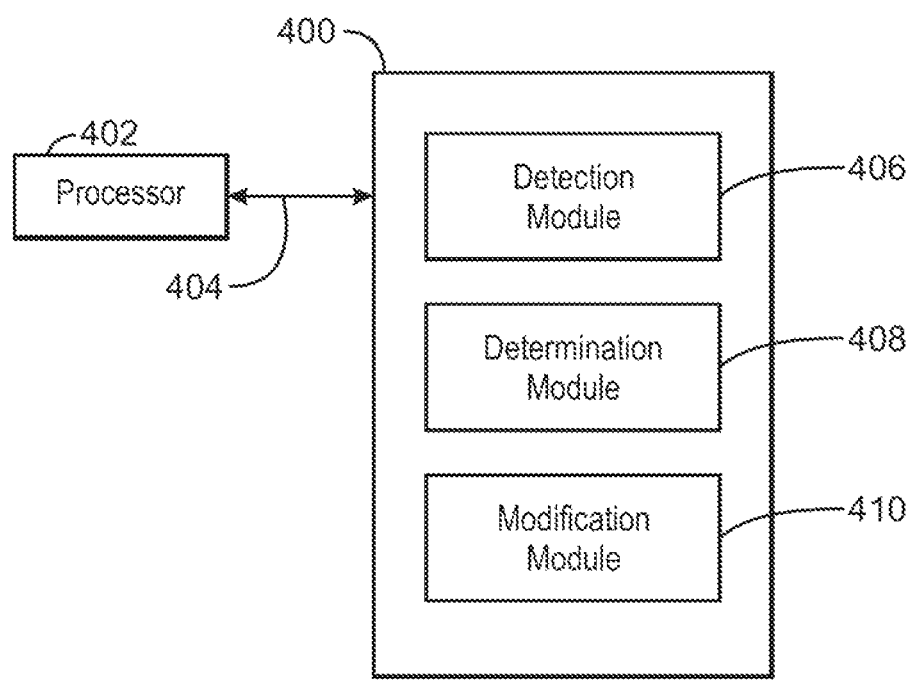
FIG. 4 is a block diagram showing a tangible, non-transitory, computer-readable medium that stores code for providing support for managing device states based on contextual data in accordance with embodiments.

FIG. 4 is a is a block diagram showing a tangible, non-transitory computer-readable medium 400 that stores code for providing support for managing device states based on contextual data in accordance with embodiments. The tangible, non-transitory computer-readable medium 400 may be accessed by a processor 402 over a computer bus 404. Furthermore, the tangible, non-transitory, computer-readable medium 400 may include code configured to direct the processor 402 to perform the methods described herein.

The various software components discussed herein may be stored on the tangible, non-transitory computer-readable medium 400, as indicated in FIG. 4. For example, a detection module 406 may be configured to detect and gather contextual data from a sensor communicatively coupled to a sensor controller. The detection module 406 may also be configured to receive power-management data including an operational state of a device. For example, the tangible, non-transitory computer-readable medium 400 may be used on a sensor controller, such as the sensor controller 128 of FIG. 1-2, which may be communicatively coupled to a device such as the computing device 100 of FIG. 1.

The non-transitory computer-readable medium 400 may also include a determination module 408 configured to determine when the contextual data indicates that a predetermined threshold has been met. For example, the predetermined threshold may be related to a level of ambient light. When the level of ambient light is detected by a ambient light sensor communicatively coupled to the tangible, non-transitory computer-readable medium, the determination module 408 may determine that the predetermined threshold has been met.

The non-transitory computer-readable medium 400 may also include a modification module 410. The modification module 410 may be configured to modify the operational state of the device based on the contextual data. For example, the contextual data may indicate that the predetermined threshold has been met, and the power-management data may indicate that the device is in a sleep state, and the tangible, non-transitory computer-readable medium may, via the modification module 410, wake up the device by waking up the main processor of the device.

Example 1

A sensor controller is described herein. The sensor controller includes a processor. The sensor controller also includes a sensor to gather contextual data. The sensor controller also includes a computer-readable medium that stores instruction thereon that, when executed by the processor, direct the processor to receive power-management data including an operational state of a device communicatively coupled to the sensor controller. The instructions may also direct the processor to modify the operational state of the device based on the contextual data and the power-management data.

The sensor controller may include additional processors in the sensor controller. Also, the sensor controller may include additional sensors. The sensors may be a part of the sensor controller or may be external components to the sensor controller and communicatively coupled to the sensor controller.

Example 2

A method is described herein. The method may include gathering contextual data from a sensor communicatively coupled to a sensor controller. The method may also include receiving power-management data including an operational state of a device communicatively coupled to the sensor controller. The method may also include modifying the operational state of the device based on the contextual data and the power-management data.

The contextual data may be gathered in parallel to receiving power-management data. Also, the contextual data may be gathered after receiving power-management data. Also, modification of the operational state of the device may be based on contextual data alone or power-management data alone.

Example 3

At least one computer-readable medium is described herein. The computer-readable medium may have instructions stored therein that, in response to being executed on a computing device, cause the computing device to gather contextual data from a sensor communicatively coupled to a computing device. The instructions may also cause the computing device to receive power-management data including an operational state of a main processor communicatively coupled to the computing device. The instructions may also cause the computing device to modify the operational state of the main processor based on the contextual data and the power-management data.

The at least one computer-readable medium may carry out the instructions in a different order. For example, the contextual data may be gathered in parallel to receiving power-management data. Also, the contextual data may be gathered after receiving power-management data. Also, modification of the operational state of the device may be based on contextual data alone or power-management data alone.

Example 4

A system is described herein. The system may include a sensor controller communicatively coupled to a sensor to gather contextual data; a processor of the sensor controller. The system may also include a main processor of a device communicatively coupled to the sensor controller. The system may also include a computer-readable medium of the sensor controller that stores instruction thereon that, when executed by the processor, direct the processor to receive power-management data including an operational state of the device communicatively coupled to the sensor controller. The instructions may also direct the processor to modify the operational state of the device based on the contextual data and the power-management data.

The instructions may be carried out in a different order. For example, the contextual data may be gathered in parallel to receiving power-management data. Also, the contextual data may be gathered after receiving power-management data. Also, modification of the operational state of the device may be based on contextual data alone or power-management data alone. The sensor controller may also include additional processors in the sensor controller. Also, the sensor controller may include additional sensors. The sensors may be a part of the sensor controller or may be external components to the sensor controller and communicatively coupled to the sensor controller.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

In the preceding description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A sensor controller comprising:
  a sensor controller processor to gather contextual data from a sensor; and
  a computer-readable medium that stores instruction thereon that, when executed by the sensor controller processor, direct the sensor controller processor to:
    receive power-management data comprising an operational state of a device communicatively coupled to the sensor controller, the power management data to be received from a sideband signal;
    format the contextual data to remove vendor specific indicators; and
    modify the operational state of the device based on the formatted contextual data and the power-management data, the formatted contextual data comprising a proximity of the device to a user, wherein the operational state comprises a power off state to describe when a main processor is completely powered off and cannot be awakened by the sensor controller, and wherein the sensor controller processor is to modify the operation of the sensor controller based on the power-management data by powering down the sensor when the main processor of the device is in the power off state.

2. The sensor controller of claim 1, wherein:
the sensor controller is to gather the contextual data and analyze the contextual data when the main processor is in a sleep state.

3. The sensor controller of claim 2, further comprising a real-time clock sensor configured to generate timestamp data, wherein the sensor controller processor is configured to associate the timestamp data with the analyzed contextual data.

4. The sensor controller of claim 3, further comprising a storage device communicatively coupled to the sensor controller to store the associated timestamp data and analyzed contextual data in response to the linear acceleration threshold being exceeded.

5. The sensor controller of claim 4, wherein the sensor controller is to provide the associated timestamp data and analyzed contextual data to the main processor.

6. A method comprising:
gathering, via a sensor controller processor, contextual data from a sensor communicatively coupled to a sensor controller;
receiving, via the sensor controller processor, power-management data comprising an operational state of a device communicatively coupled to the sensor controller, the power management data to be received from a bus-independent sideband general purpose input/output (GPIO) signal;
formatting, via the sensor controller processor, the contextual data to remove vendor specific indicators;
modifying, via the sensor controller processor, the operational state of the device based on the formatted contextual data and the power-management data, the formatted contextual data comprising a proximity of the device to a user, wherein the operational state comprises a power off state to describe when a main processor is completely powered off and cannot be awakened by the sensor controller, and wherein the sensor controller processor is to modify the operation of the sensor controller based on the power-management data by powering down the sensor when the main processor of the device is in the power off state.

7. The method of claim 6, further comprising
analyzing the contextual data to determine when the contextual data indicates that a linear acceleration threshold has been met.

8. The method of claim 7, further comprising:
gathering timestamp data from a real-time clock sensor configured to generate timestamp data; and
associating the timestamp data with the analyzed contextual data.

9. The method of claim 8, further comprising storing the associated timestamp data and analyzed contextual data on a storage device communicatively coupled to the sensor controller in response to the linear acceleration threshold being exceeded.

10. The method of claim 9, further comprising providing the associated timestamp data and analyzed contextual data to the main processor once the linear acceleration threshold has been exceeded.

11. At least one non-transitory computer-readable medium having instructions stored therein that, in response to being executed on a computing device, cause the computing device to:
gather, via a sensor controller processor, contextual data from a sensor communicatively coupled to a computing device;
receive, via the sensor controller processor, power-management data comprising an operational state of a main processor communicatively coupled to the computing device, the power management data to be received from a bus-independent sideband general purpose input/output (GPIO) signal;
format, via the sensor controller processor, the contextual data to remove vendor specific indicators; and
modify, via the sensor controller processor, the operational state of the main processor based on the formatted contextual data and the power-management data, the formatted contextual data comprising a proximity of the computing device to a user, wherein the operational state comprises a power off state to describe when a main processor is completely powered off and cannot be awakened by the sensor controller, and wherein the sensor controller processor is to modify the operation of the sensor controller based on the power-management data by powering down the sensor when the main processor of the device is in the power off state.

12. The at least one non-transitory computer-readable medium of claim 11, wherein:
the instructions further cause the computing device to analyze the contextual data to determine when the contextual data indicates that a linear acceleration has been exceeded.

13. The at least one non-transitory computer-readable medium of claim 12, wherein the instructions further cause the computing device to:
gather timestamp data from a real-time clock sensor configured to generate timestamp data; and
associate the timestamp data with the analyzed contextual data.

14. The at least one non-transitory computer-readable medium of claim 13, wherein the instructions further cause the computing device to store the associated timestamp data and analyzed contextual data on a storage device communicatively coupled to the computing device in response to the linear acceleration threshold being exceeded.

15. The at least one non-transitory computer-readable medium of claim 14, wherein the instructions further cause the computing device to provide the associated timestamp data and analyzed contextual data to the main processor once the linear acceleration threshold has been exceeded.

16. A system comprising:
a sensor controller communicatively coupled to a sensor to gather contextual data;
a sensor controller processor of the sensor controller;
a main processor of a device communicatively coupled to the sensor controller;
a non-transitory computer-readable medium of the sensor controller that stores instruction thereon that, when executed by the sensor controller processor, direct the sensor controller processor to:
receive power-management data comprising an operational state of the device communicatively coupled to the sensor controller, the power management data to be received from a bus-independent sideband general purpose input/output (GPIO) signal;

format the contextual data to remove vendor specific indicators, the vendor specific indicators; and modify the operational state of the device based on the formatted contextual data and the power-management data, the formatted contextual data comprising a proximity of the system to a user, wherein the operational state comprises a power off state to describe when a main processor is completely powered off and cannot be awakened by the sensor controller, and wherein the sensor controller processor is to modify the operation of the sensor controller based on the power-management data by powering down the sensor when the main processor of the device is in the power off state.

17. The system of claim 16, wherein the sensor controller is to gather the contextual data and analyze contextual data when the main processor is in a sleep state.

18. The system of claim 17, further comprising a real-time clock sensor to generate timestamp data, wherein the processor is to associate the timestamp data with the analyzed contextual data.

19. The system of claim 18, further comprising a storage device communicatively coupled to the sensor controller to store the associated timestamp data and the analyzed contextual data in response to a linear acceleration threshold being exceeded.

20. The system of claim 19, wherein the sensor controller is to provide the associated timestamp data and the analyzed contextual data to the main processor once the linear acceleration threshold has been met.

21. The system of claim 16, wherein the sensor controller is a sensor controller hub having sensors communicatively coupled to the sensor controller hub, and the sensor controller hub being communicatively coupled to the main processor.

* * * * *